May 13, 1930.  L. J. LEON  1,758,525
BIRD CAGE
Filed June 23, 1924
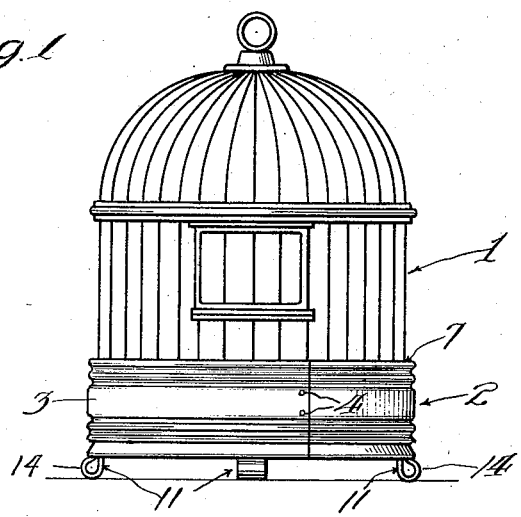
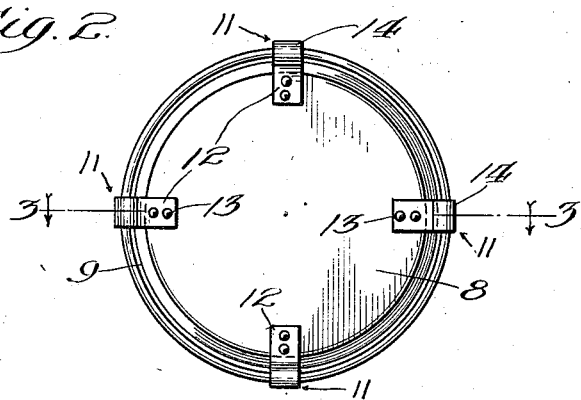
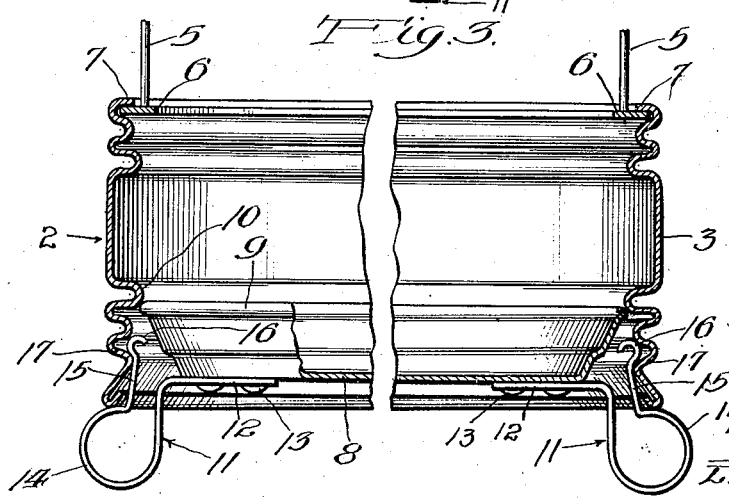

Patented May 13, 1930

1,758,525

UNITED STATES PATENT OFFICE

LEWICKI J. LEON, OF CHICAGO, ILLINOIS, ASSIGNOR, BY MESNE ASSIGNMENTS, TO THE ANDREW B. HENDRYX COMPANY, A CORPORATION OF CONNECTICUT

BIRD CAGE

Application filed June 23, 1924. Serial No. 721,673.

This invention relates to bird cages having a cage body and a base.

One object of my invention is to so construct the base that the same may be opened without separating the base from the cage body, and thus be able to keep relatively small the opening made to prevent the escape of the bird from the cage.

Another object of my invention is to accomplish this result by releasably connecting the bottom wall of the base with its marginal wall so that the base may be opened upon removal of its bottom wall.

A further object of my invention is to provide an all around connection between the base and cage body and thus avoid the use of catches as heretofore.

A further object of my invention is to make the marginal wall of the base in band form and from a strip of sheet metal, such as brass or other relatively light material, thus allowing this part of the base being rolled to shape at a reduced cost.

Another object of my invention is to so provide the fastening means that they project below the base and form legs or supports for elevating the cage above an underlying surface.

The structural design of my invention permits making either one or both parts of the base of the cage of relatively light, non-metallic material, such as pyroxylin, celluloid, or the like, or making the entire cage of said material.

Other and further objects of my invention will appear from the following specification, taken in connection with the accompanying drawings, in which—

Fig. 1 is a view of a bird cage embodying the features of my invention;

Fig. 2 is a bottom plan view of the cage; and

Fig. 3 is a vertical sectional view taken on line 3—3 of Fig. 2.

As illustrated in Fig. 1, the cage comprises a body 1 and a base 2, both circular in form and with the top of the cage body dome shape, as shown.

The base 2 has an upright marginal wall 3 made in the form of an annular band from a single strip of material such as sheet brass or such other material as may be employed. After being bent into annular form, the band 3 has its meeting ends secured together in any suitable manner, as by rivets 4, as shown in Fig. 1. The wall 3, being in the form of a one-piece band, is open clear through, and may be rolled, thus being cheaper to make.

The cage body 1 comprises spaced wires 5, 5 and a lower member or ring 6 around the lower edge of the body, as shown in Fig. 3. Said ring 6 is flat and arranged horizontally to enter a channel formed by turning in the upper edge 7 of the wall 3. In assembling, the wall 3 is applied about the ring 6 and its ends fixed together to lock the ring in the channel 7, thus holding the base and cage body against separation, and providing a continuous and unbroken connection around the cage. This connection is solid and rigid and enables the cage body 1 and base 2 to be connected without the use of catches, as heretofore.

The bottom 8 of the base 2 is flat and circular to conform to the shape of the opening made by the wall 3. The bottom 8 has an upright marginal flange 9, which gives the bottom a tray shape. This flange 9 lies inside of the base 2 when the parts are assembled, and the wall 3 of said base is provided above the upper edge of said flange 9 with an inwardly extending annular bead 10 projecting over the flange 9 to prevent seed from dropping out of the base between the wall 3 and flange 9.

For releasably connecting the bottom 8 with the wall 3, I provide fastening means, which as shown in the drawings comprise a plurality of catch members 11, 11 carried by the bottom 8 and spaced about the same. As shown in Fig. 2, four of these catch members are employed, and they are given quarter spacing around the bottom 8 when the base 2 is circular.

Each catch 11 is formed from a strip of spring material, as sheet metal, and is bent to have the shape shown in Fig. 3. There it will be noted that the catch member 11 has a flat end portion 12 secured to the under side of the bottom 8, as by rivets 13. The joining portion 14 of the catch member is bent to be somewhat circular in shape and extends below the base 2 so as to form a leg or support for the cage. This portion 14 continues into the free outer end portion 15 of the catch member, and said portion 15 extends into the base 2 between its wall 3 and the flange 9 of the bottom 8. Said portion 15 has an outwardly bent part 16 to engage over a shoulder 17 provided on the wall 3. The wall below the stop member 10 is so shaped that there is sufficient space between the wall and the base flange 9 to enable the free end 15 of the catch member to be released from the shoulder 17 on pressing in on the catch member. This provides a detachable connection between the base 2 and its bottom 8, so that the base may be opened on removing the bottom 8.

By making the catch portion 14 somewhat circular in shape, such portion presents an upturned surface as a seat for the lower edge of the wall 3 and thus aids in properly supporting the cage by the catch members 11. To strengthen or stiffen this lower edge, it may be folded or turned on itself, as shown. In addition to the beads 7 and 10, the upper and lower marginal portions of the wall 3 may be beaded for strengthening as well as ornamenting. These portions may be made alike to cheapen the cost of production. The lower portion of the wall 3 may be flared outward slightly to pass the free ends of the catches 11 and allow them to snap over the shoulder 17 on applying the bottom to the base.

By the structure shown and described, the cage body 1 and base 2 are fixed together against separation and the base has a removable bottom wall. Thus the cage may be opened for cleaning or otherwise without likelihood of the bird escaping, as separation of the cage body and base, as heretofore, is avoided.

The fastening members 11 serve a dual purpose, namely, not only to hold the bottom 8 in the base 2, but also to form legs to elevate the bottom of the cage above an underlying support and thus prevent the latter as well as the bottom wall of the cage from being scratched or marred one by the other.

Having the cage ring 6 in the channel 7 secures a continuous and unbroken connection between the cage body 1 and base 2 all around. This provides a rigid and solid connection between these parts, and thus avoids suspending the base from relatively weak catches as heretofore.

The wall 3 being made from a strip or band of material, permits making such wall from relatively light, non-metallic material, such as pyroxylin, celluloid, or the like. Use of such material is further made possible by having said wall upright or vertical so as to take the weight of the cage body edgewise and thus present its greatest strength for supporting purposes. Moreover, this wall is reinforced, as for instance by the flange 7 and the bead 10, as well as the others shown. The weight of the cage when seated on an underlying support is on the fasteners 11 and the upright wall 3, thus freeing the bottom 8 of any of this weight. Thus the bottom 8 can also be made of the light material aforesaid. The connection between the cage body and the base 2 being by the ring 6 and flange 7 makes a continuous and very solid connection, thus permitting the use of the light material in the base, not possible with the suspended point connection as heretofore used in fastening the base and cage body together.

The base 2 being made of pyroxylin is easy to keep clean and thus sanitary. Pyroxylin, celluloid and like materials are supplied commercially in different colors without much difference in price, thus allowing the bases to be made in different colors to harmonize with the color scheme of the cages, with no cost for finishing in colors.

While I have shown and described herein in detail the features of my invention, it is of course to be understood that the details of construction and arrangement of parts, as well as shape of the cage, may be variously changed and modified without departing from the spirit and scope of my invention.

I claim as my invention:

1. A cage, comprising a cage body and a base, said base having an upright marginal wall and a bottom wall, and means permanently connecting the cage body to the upper portion of said marginal wall, consisting of horizontally disposed interfitting channel and ring portions on the base and body, respectively, and extending entirely about the same.

2. A cage, comprising a cage body and a base, said base having marginal and bottom walls, said marginal wall having in its upper portion an inwardly facing channel, said cage body having a surrounding member at its lower end to enter said channel to permanently connect the base and cage body together entirely about the same.

3. A cage, comprising a cage body and a base, said cage body carrying a surrounding member at its lower end, said base having a marginal wall and a separable bottom wall, the latter being releasably connected with the former, said marginal wall having an inwardly opening channel above the bottom wall to receive the bottom member of the cage body for permanently connecting the cage body and base together entirely about the same, said marginal wall being in open band form, embracing the lower member of the body and having the meeting ends of the band secured together.

4. A base for bird cages having a marginal wall and a separable bottom wall, and spring catch members releasably connecting said walls together and carried by said bottom wall, said catch members being spaced apart about the base and extending below the same to provide supports therefor.

5. A base for bird cages having a marginal wall and a separable bottom wall, the latter having a marginal flange, and spring catch members carried by the bottom wall and releasably engaging the marginal wall on the inside in the space between said marginal wall and said flange, said marginal wall having a shoulder to be engaged by the catch members, and said catch member having portions to be engaged by the lower edge of said marginal wall.

6. A base for bird cages having an upright marginal wall and a separable bottom wall, and spring catches for releasably connecting said walls together, said catches being carried by one of said walls and releasably engaging the other wall, said spring catches having portions extending below the base to provide supports or feet therefor.

7. A bird cage comprising an upper wire portion and a lower band portion, one of said portions being provided with a channel and the other being provided with a horizontally disposed ring fitting within said channel to permanently secure the portions of the cage together.

8. A bird cage comprising an upper portion made of wire-form elements and a lower band portion, said band portion being formed with an internal, upwardly facing shoulder below its upper edge, said upper portion being provided with a horizontally disposed ring adjacent its lower end, said ring being telescoped within the upper edge of the band portion of the cage and seated on said shoulder, and means formed integrally with the band portion projecting over the ring to permanently secure the parts of the cage together.

9. A bird cage comprising an upper portion of wire-form elements having a horizontally disposed ring adjacent the lower part thereof, and a lower band-like portion, said band-like portion having the wall thereof displaced outwardly at an intermediate point in the height of the wall to form an internal shoulder, said ring being seated on said shoulder, and the upper edge of the band-like portion being turned inwardly over said ring to secure it in place upon the shoulder.

10. A bird cage comprising an upper portion of wire-form elements and a lower band-like portion, the wall of said band-like portion adjacent the upper edge thereof being displaced inwardly and then outwardly to provide a corrugation and an inwardly extending upwardly directed shoulder, the upper portion of said cage having a ring extending within the band-like portion of the cage and having a ring seated on said shoulder, and means for securing said ring in place.

11. In a bird cage, a band portion, a bottom portion at the lower end of the band portion, a wire portion at the upper end of the band portion, and means to permanently secure the wire portion to the band portion comprising a groove in the band portion and an element on the wire portion seated in said groove.

12. In a bird cage, a band portion, a bottom portion at the lower end of the band portion, a wire portion at the upper end of the band portion, and means to permanently secure the wire portion to the band portion comprising a groove in the band portion and a ring-like element on the wire portion seated in said groove.

13. In a bird cage, a band portion, a bottom portion at the lower end of the band portion, a wire portion at the upper end of the band portion, and a ring-like element at the lower end of the wire portion, said band portion comprising a strip of material having a groove near an edge thereof, said strip being bent into the form of a ring with the ring-like element received in the groove thereof and the meeting edges of said ring being secured together to close the groove about said element and hold it against upward or downward movement.

14. A bird cage having a top centrally located member, the lower sides of the cage being formed of sheet metal having an annular inwardly opening channel near its upper edge, and having a ring permanently secured in said channel, and the upper sides and top of the cage being formed of wires which extend from the ring in the channel to the top centrally located member, and said wires being secured both to said ring and said member.

15. A base for bird cages having a marginal wall and a separable bottom wall, the latter having a marginal flange, and spring catch members for releasably connecting said walls together, said catches being carried by one of said members and releasably engaging the other in the space between the marginal wall and said flange.

16. A cage comprising a cage body and a base, said base having an upright marginal wall and a bottom member, said marginal wall being in band form and applied about the lower portion of the cage body with the meeting ends of the band secured together, and means on said band and the lower portion of the cage body becoming inter-engaged for permanently connecting the cage body to the band when the band is applied and its ends so secured.

In testimony that I claim the foregoing as my invention, I affix my signature this 20th day of June, 1924.

LEWICKI J. LEON.